United States Patent [19]

Takagi et al.

[11] Patent Number: 4,525,065
[45] Date of Patent: Jun. 25, 1985

[54] METHOD FOR CONTROLLING AN EXPOSURE TIME IN CONSIDERATION OF THE RECIPROCITY LAW FAILURE OF A PHOTOSENSITIVE MATERIAL

[75] Inventors: Tsuneo Takagi, Kurita; Hiroyuki Yonehara, Hikone, both of Japan

[73] Assignee: Dainippon Screen Seizo Kabushiki Kaisha, Kyoto, Japan

[21] Appl. No.: 503,658

[22] Filed: Jun. 13, 1983

Related U.S. Application Data

[63] Continuation-in-part of Ser. No. 275,698, Jun. 22, 1981, abandoned.

[51] Int. Cl.³ .............................................. G03B 27/32
[52] U.S. Cl. ........................................ 355/77; 355/35
[58] Field of Search ............................. 355/35, 38, 77

[56] References Cited

U.S. PATENT DOCUMENTS

| | | | |
|---|---|---|---|
| 3,443,868 | 5/1969 | Mitchell | 355/77 |
| 3,873,199 | 3/1975 | Weinert | 355/77 |
| 4,025,190 | 5/1977 | Hughes | 355/77 |
| 4,068,943 | 1/1978 | Gyori | 355/77 |
| 4,149,799 | 4/1979 | Pone et al. | 355/77 |
| 4,175,856 | 11/1979 | Pone | 355/77 |
| 4,206,998 | 6/1980 | Tokuda | 355/77 |

Primary Examiner—Monroe H. Hayes
Attorney, Agent, or Firm—Yuter, Rosen & Dainow

[57] ABSTRACT

Controlling the exposure time in the reciprocity law failure range of a photosensitive material, in a picture reproducing machine, wherein the response time variation cause by variations is corrected according to the operational equation for the reciprocity law when the photosensitive material is in its linear range, by exposing said photosensitive material for a time $t_m$ in accordance with the relationship;

$$Tm\left(\frac{1 + Mi}{2}\right)^{2P} \cdot T_0$$

wherein $T_0$ is the correct exposure time in the absence of reciprocity law failure, $M_i$ is the desired reproduction scale and P is an empirically determined coefficient which is greater for enlargements than reductions.

4 Claims, 9 Drawing Figures

METHOD FOR CONTROLLING AN EXPOSURE TIME IN CONSIDERATION OF THE RECIPROCITY LAW FAILURE OF A PHOTOSENSITIVE MATERIAL

This application is a continuation-in-part application Ser. No. 275,698, filed June 22, 1981 now abandoned.

BACKGROUND OF THE INVENTION

This invention relates to a method for controlling an exposure time in consideration of the reciprocity law failure of a photosensitive material, for use in a picture reproducing machine such as a process camera, and the like.

In a conventional automatic process camera, distances between the picture holder and lens holder and between the photosensitive film holder and the lens holder are automatically determined in dependence on the reproduction scale, and then the proper exposure time for photographing conditions is automatically determined depending on the reproduction scale, the diaphragm opening size, and a density of the essential part of an original picture, in order to photograph the original picture properly and automatically.

However, the thus obtained exposure time is proper only as long as the reciprocity law of the photosensitive film used is valid, but under the photographing conditions in which the reciprocity law of the photosensitive film is not valid, the exposure time is practically improper.

In order to correct the reciprocity law failure and to obtain a proper exposure time, the photosensitive characteristics of the photosensitive material should be known, and the experience of the operator must be relied upon. Hence, under the photographing conditions of reciprocity law failure, in practice, the exposure time is automatically obtained as if the reciprocity law were valid, and then the correction time considered by the operator, depending on his experience, is added to or subtracted from the obtained exposure time. In this embodiment, therefore, in fact, the automatic exposure control is imperfectly performed.

In this case, the reason that the experimental knowledge of the operator is required for correcting the reciprocity law failure, is as follows. The photosensitive characteristics depend on the photosensitive materials, and the exposure time varies depending on the distances between the picture holder and the lens holder and between the photosensitive film holder and the lens holder at a certain reproduction scale, the diaphragm opening size, and the density of the original picture all of which synergistically affect one another. Further, it is experimentally confirmed that the exposure time is varied when the lens is exchanged so as to change the focal distance in order to vary the reproduction scale. Accordingly, since these factors synergistically affect one another, the correction time cannot be obtained according to the convention period.

SUMMARY OF THE INVENTION

It is an object of the present invention to provide a method for controlling an exposure time in consideration of the reciprocity law failure of a photosensitive material, for use in a picture reproducing machine such as a process camera, free from the aforementioned defects, which is capable of performing an accurate, automatic and quick control of an exposure time, and reproducing a uniform picture image regardless of the photographing conditions.

According to the present invention a method is provided for controlling an exposure time in consideration of the reciprocity law failure of a photosensitive material, for use in a picture reproducing machine wherein the exposure time variation caused by varying the photographing conditions is corrected according to an operational equation when the reciprocity law of the photosensitive material holds good. In accordance with the invention a predetermined correction factor for correcting the reciprocity law failure of the photosensitive material is inserted in the operational equation, in order to determine the proper exposure time at which the reciprocity law failure is corrected.

BRIEF DESCRIPTION OF DRAWINGS

In order that the present invention may be better understood, preferred embodiments thereof will be described with reference to the accompanying drawings, in which.

DESCRIPTION OF PREFERRED EMBODIMENTS

Figure 1:
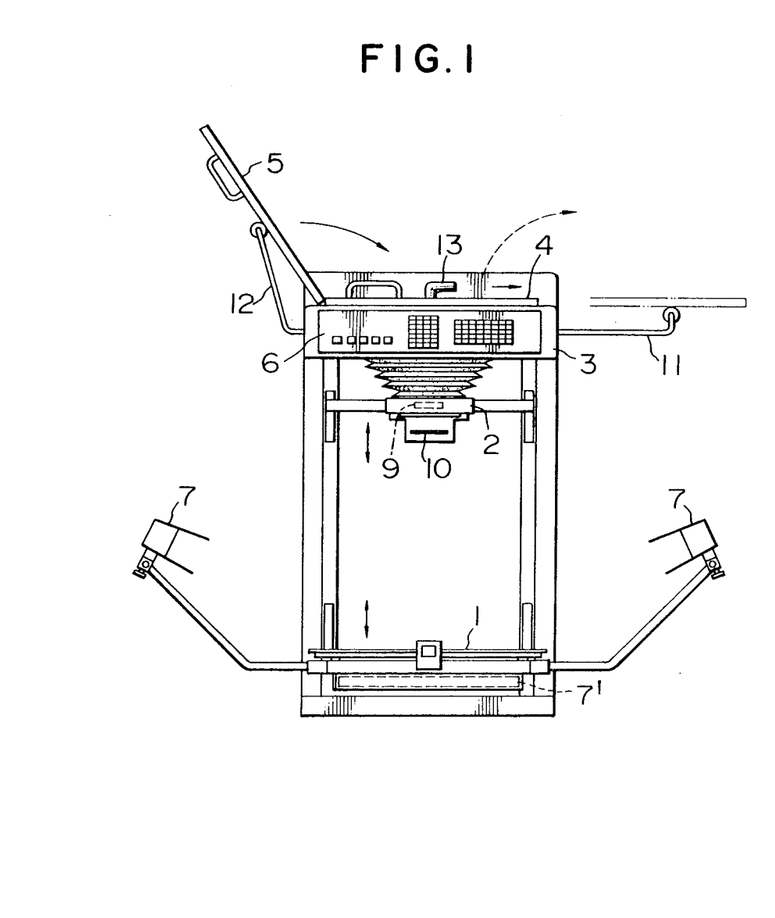
FIG. 1 is an elevational view of an upright process camera which performs a method according to the present invention.
Figure 2:
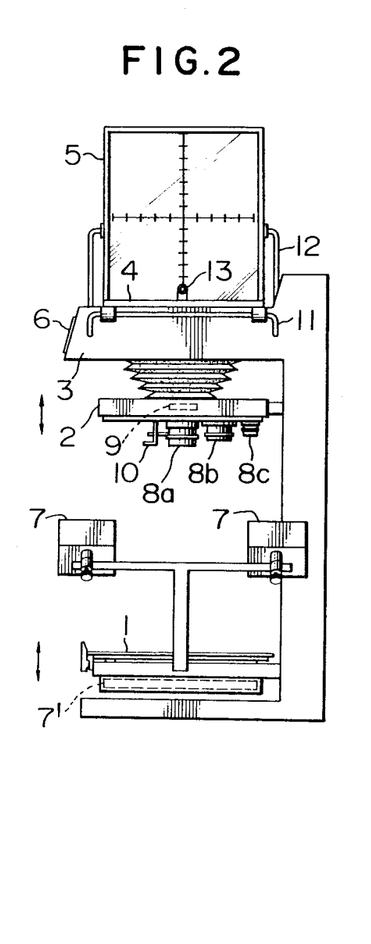
FIG. 2 is a right side view of FIG. 1.

Referring now to the drawings, FIGS. 1 and 2 show an automatic upright process camera which carries out a method according to the present invention, comprising an original picture holder 1 made of a transparent or light display plate on which an original picture is mounted, a lens holder 2, a film holder 3 on which either film support frame 4 on which a photosensitive material or film is mounted, or focusing glass frame 5 is pivotally and replaceably mounted to either side portion of the film holder 3 via support members 11 or 12, the three holders being aligned along a vertical axis, an operational board 6 disposed on the front of the film holder 3, pairs of lights 7 mounted to the original picture holder 1 via brackets, for photographing a light reflected from the original picture, and a light 7' mounted under the original picture holder 1 for photographing a light passing through the original picture.

The picture holder 1 and the lens holder 2 are movable vertically towards or away from the fixed film holder 3. The positions of the three holders 1, 2 and 3 are automatically determined depending on a reproduction scale input to the operational board 6.

A plurality of focusing lenses 8a, 8b and 8c having different focal distances are interchangeably mounted on the lens holder 2, and a shutter 9 for controlling the main exposure light and a diaphragm adjuster 10 which adjusts the diaphragm of each focusing lens. The lens holder 2 is provided with a flash lamp (not shown) for a flash exposure.

The film support frame 4 is provided with an air suction pipe 13 in the center of its upper surface. The suction pipe 13 is connected to suction means (not shown) such as a vacuum pump. The photosensitive film is tightly retained by and onto the film support frame 4 by sucking air through the suction pipe 13.

The automatic process camera shown in FIGS. 1 and 2 is operated by handling a keyboard, switches, buttons, and the like, provided on the operational board 6, as hereinafter described in detail.

Figure 3:
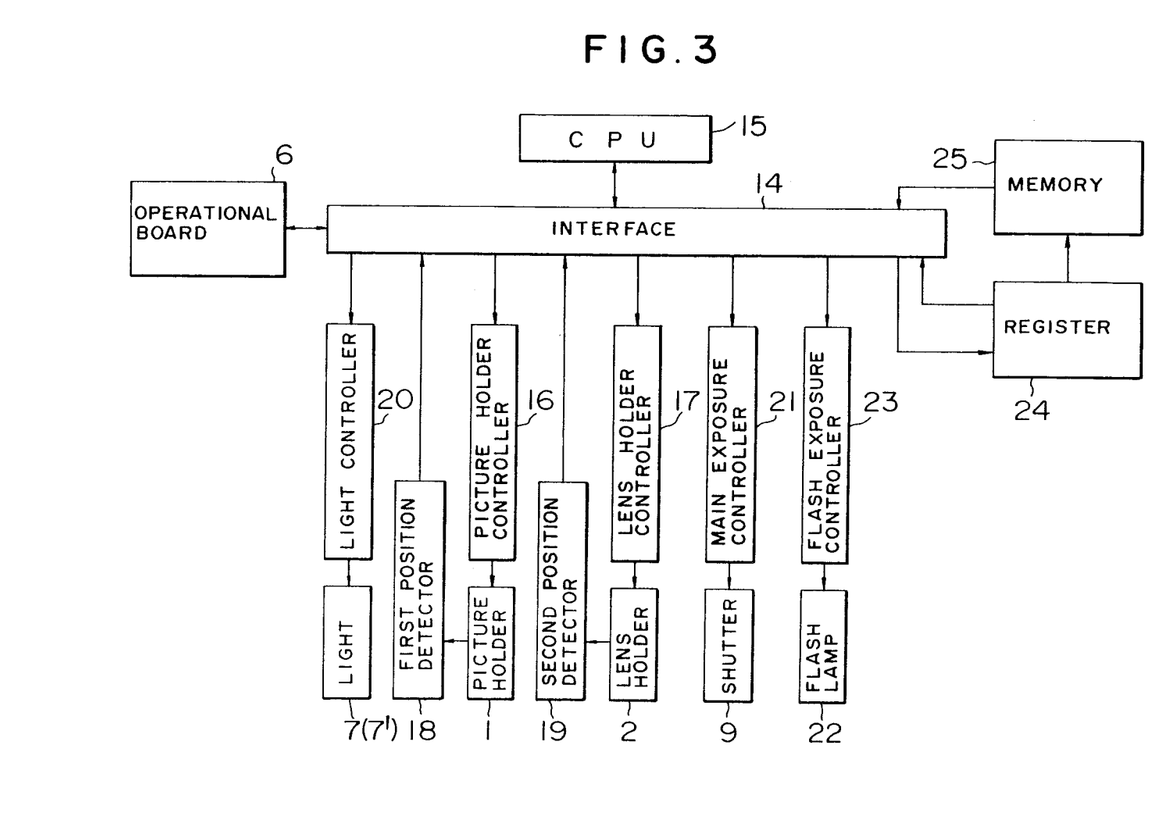
FIG. 3 is a block diagram of a control system of the process camera shown in FIGS. 1 and 2.

FIG. 3 shows a control system for the process camera of FIGS. 1 and 2. The operational board 6 is connected to a central processing unit 15, as hereinafter referred to as CPU for short, such as a processor, via an interface 14. The CPU 15 automatically controls the process camera according to the data input from the operational board 6.

Drive signals are output from the CPU 15 to a picture holder controller 16 and a lens holder controller 17 via the interface 14, and then the picture holder controller 16 and the lens holder controller 17 drive the picture holder 1 and the lens holder 2. The positions of the picture holder 1 and the lens holder 2 are detected by first and second position detector 18 and 19. The position data detected by the position detectors 18 and 19 are fed to the CPU 15 through the interface 14. Then, the CPU 15 calculates the final positions to be set for the picture holder 1 and the lens holder 2, depending on the position data obtained and the desired reproduction scale input from the operational board 6, and controls the picture holder 1 and the lens holder 2 to move them to their destination positions.

The lights 7 and 7', the shutter 9, and the flash lamp 22 in the lens holder 2 are controlled respectively by a light controller 20, a main exposure controller 21 and a flash exposure controller 23 according to control signals fed thereto from the CPU 15 via the interface 14.

In a conventional main exposure time control method, an exposure time Ta of which the reciprocity law is valid, is calculated by the CPU 15 according to the following equation (1), wherein $M_i$, $F_i$, and $D_i$ are the desired reproduction scale, the desired diaphragm opening size and the highlight density value of the essential part of the original picture, respectively, which are fed from the operational board 6, and wherein $F_0$, $D_0$ and $T_0$ are the reference diaphragm opening size, reference highlight density value and reference proper exposure time of a reference picture at a reproduction scale of unity, which are predetermined.

$$Ta = \left(\frac{1 + M_i}{2}\right)^2 \cdot \left(\frac{F_i}{F_0}\right)^2 \cdot 10^{D_i - D_0} \cdot T_0 \quad (1)$$

However, this equation is not always satisfied under all photographing conditions, i.e. under reciprocity law failure which depends on the photosensitive material and has different characteristics for each photosensitive material.

Figure 4:
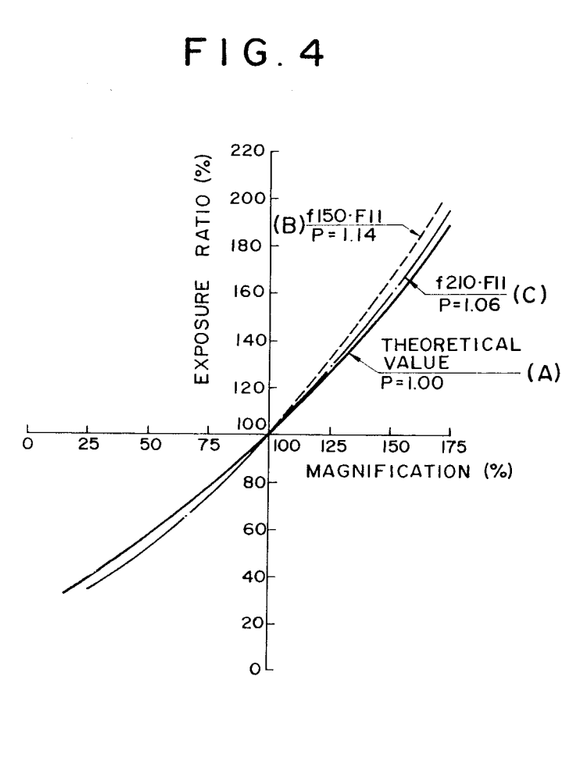
FIG. 4 is a graph showing one example of the reciprocity law failure of a photosensitive material used in the present method.
Figure 5:
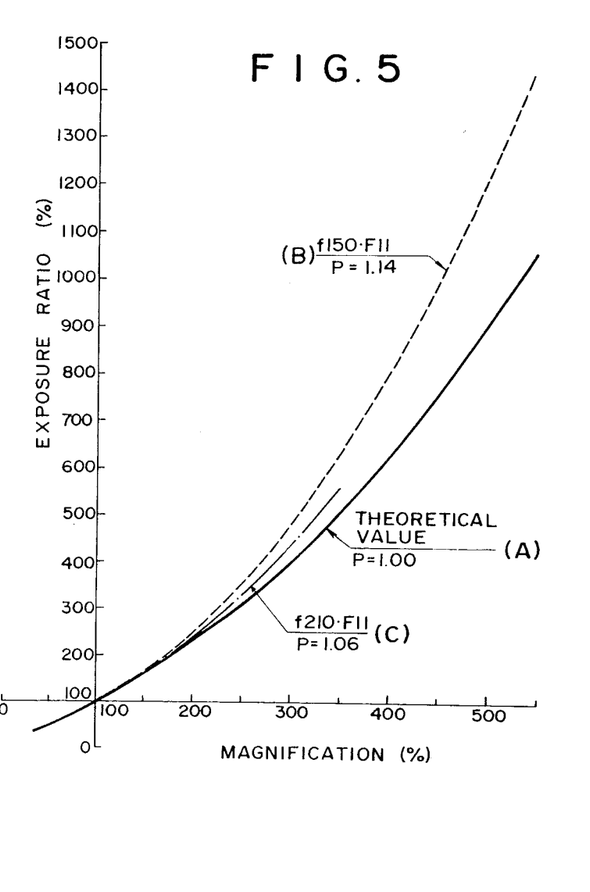
FIG. 5 is an enlarged view of FIG. 4.

FIGS. 4 and 5 are graphs showing one example of the experimental data of the reciprocity law failure of a photosensitive material named "FUJILITHORTHO VO-100", wherein the relation between the reproduction scale $M_i$ and the proper exposure time $T_i$ which are obtained by using the same copy under the following photographic conditions: $D_i = D_0$; fixed diaphragm opening number F11; $F_i = F_0$; and screen number 150 lines/inch of a contact screen used, is shown.

Curve A shown by a solid line is a theoretical characteristic line obtained according to the equation (1) under the above photographic conditions. When the actual proper exposure time, using a reproduction scale $M_i$, is $T_i$, the theoretical proper exposure time $T_2$ using a reproduction scale $M_2$ is obtained, disregarding other factors, according to the following equation:

$$T_2 = \frac{(1 + M_2)^2}{(1 + M_1)^2} \cdot T_1$$

Accordingly, since the reproduction scale is unity, and both terms $(F_i/F_0)^2$ and $10^{D_i-D_0}$ are unity under the above described conditions, the theoretical characteristic curve A is expressed as follows:

$$Ta = \left(\frac{1 + M_i}{2}\right)^2 \cdot T_0 \quad (2)$$

Characteristics curve B shown by a broken line shows the proper exposure when using a focus lens having a focal distance 150 mm. The reciprocity law failure occurs exponentially as the reproduction scale is increased away from 100%.

Characteristics curve C shown by a dash-dotted line shows the proper exposure when using another focus lens having a focal distance 210 mm. Theoretically, the curve C should be the same as the curve B, but it is not. This means that the characteristic curve of the reciprocity law failure is varied by exchanging a focusing lens having a different focal distance.

Therefore, it is apparent from these examples that in order to obtain a proper exposure time in consideration of the reciprocity law failure, variable factors for correcting the reciprocity law failure must be determined and inserted in the equations (1) and (2) so that the equations including the correction factors may accurately represent the curves such as B and C having reciprocity law failure characteristics.

In this embodiment of the invention, in order to correct reciprocity law failure due to magnification variation, a correction factor P is inserted in the formula (2), thereby obtaining the following empirical formula (3), wherein $T_m$ is the proper exposure time for which the reciprocity law failure due to magnification variation is corrected.

$$T_m = \left(\frac{1 + M_i}{2}\right)^{2P} \cdot T_0 \quad (3)$$

Then, according to the formula (3) the correction factors P of the three characteristics curves A, B and C are calculated, for example, by substituting the values picked from the curves A, B and C, to obtain P=1.00 for the curve A; P=1.14 for the curve B; and P=1.06 for the curve C, the obtained factors thus well satisfying the formula (3).

Next, the other correction factos Q and R for correcting reciprocity law failures caused by the diaphragm opening size variation and the highlight density value variation of the picture are obtained in the same manner as described above.

When the reciprocity law holds good with respect to the diaphragm opening size variation, the theoretical exposure time Ta is expressed in the following equation (4) which is obtained by substituting $Mi=1$ and $Di=D_0$ into the equation (1).

$$Ta=(Fi/F_0)^2 \cdot T_0 \qquad (4)$$

The correction factor Q for reciprocity law failure due to the diaphragm opening size variation is obtained according to the following empirical formula (5) wherein Tf is the proper exposure time for which reciprocity law failure due to the diaphragm opening size variation is corrected, in the same manner as the correction factor P.

$$Tf=(Fi/F_0)^{2Q} \cdot T_0 \qquad (5)$$

When the reciprocity law is valid with respect to highlight density value variation, the theoretical exposure time Ta is represented in the following formula (6) which is obtained by substituting $Mi=1$ and $Fi=F_0$ into the formula (1).

$$Ta=10^{Di-D_0} \cdot T_0 \qquad (6)$$

The correction factor R for reciprocity law failure due to density value variation is obtained according to the following empirical formula (7) wherein Td is the proper exposure time for which the reciprocity law failure due to the highlight density value variation is corrected, in the same manner as $$Td=10^{(Di-D_0)R} \cdot T_0 \qquad (7)$$

Hence, when the reproduction scale Mi, the diaphragm opening size Fi and the highlight density value Di vary mutually and synergistically affect one another, a proper exposure time Ti for which the reciprocity law failure is corrected, is obtained according to the following formula (8)

$$Ti = \left( \frac{1+Mi}{2} \right)^{2P} \cdot \left( \frac{Fi}{F_0} \right)^{2Q} \cdot 10^{(Di-D_0)R} \cdot T_0 \qquad (8)$$

In this case, the correction factors P, Q and R are empirically determined according to the formulae (3), (5) and (7) by using the characteristic curve of each photosensitive material, such as the one shown in FIGS. 4 or 5, in the same manner as described above. That is, the correction factors P, Q and R are obtained depending on the photosensitive material.

Since the correction factor P varies depending on the different focal distances of the different lenses, it is determined in advance for every interchangeable lens.

When the correction factors P, Q and R of the photosensitive material are determined according to the formula (8), a serial number Ai is attached to the photosensitive material. The serial number Ai is input to the operational board 6. Another serial number Bi is also attached to the interchangeable lens 8a, 8b or 8c, and it is input to the operational board 6. The correction factors Pi, Qi and Ri predetermined as described above, corresponding to the serial numbers Ai and Bi, are stored in a memory 25.

The photographing condition data such as the reproduction scale Mi, the diaphragm opening size Fi, the highlight density value Di, the photosensitive material serial number Ai, and the lens serial number Bi are fed from the operational board 6 to a register 24 via the interface 14 and they are stored in the register 24.

Then, the serial numbers Ai and Bi of the photosensitive material and the lens are sent from the register 24 to the memory 25, and the corresponding correction factors Pi, Qi and Ri are read out of the memory 25 by using the serial numbers Ai and bi. Then, the read-out correction factors Pi, Qi and Ri are fed to the CPU 15 via the interface 14. At the same time, the reproduction scale Mi, the diaphragm opening size Fi and the highlight density value Di are also input to the CPU 15 via the interface 14. Then, the CPU 15 calculates a proper exposure time Ti from the input data Mi, Fi and Di, and the correction factors Pi, Qi and Ri according to the formula (8).

Figure 6:
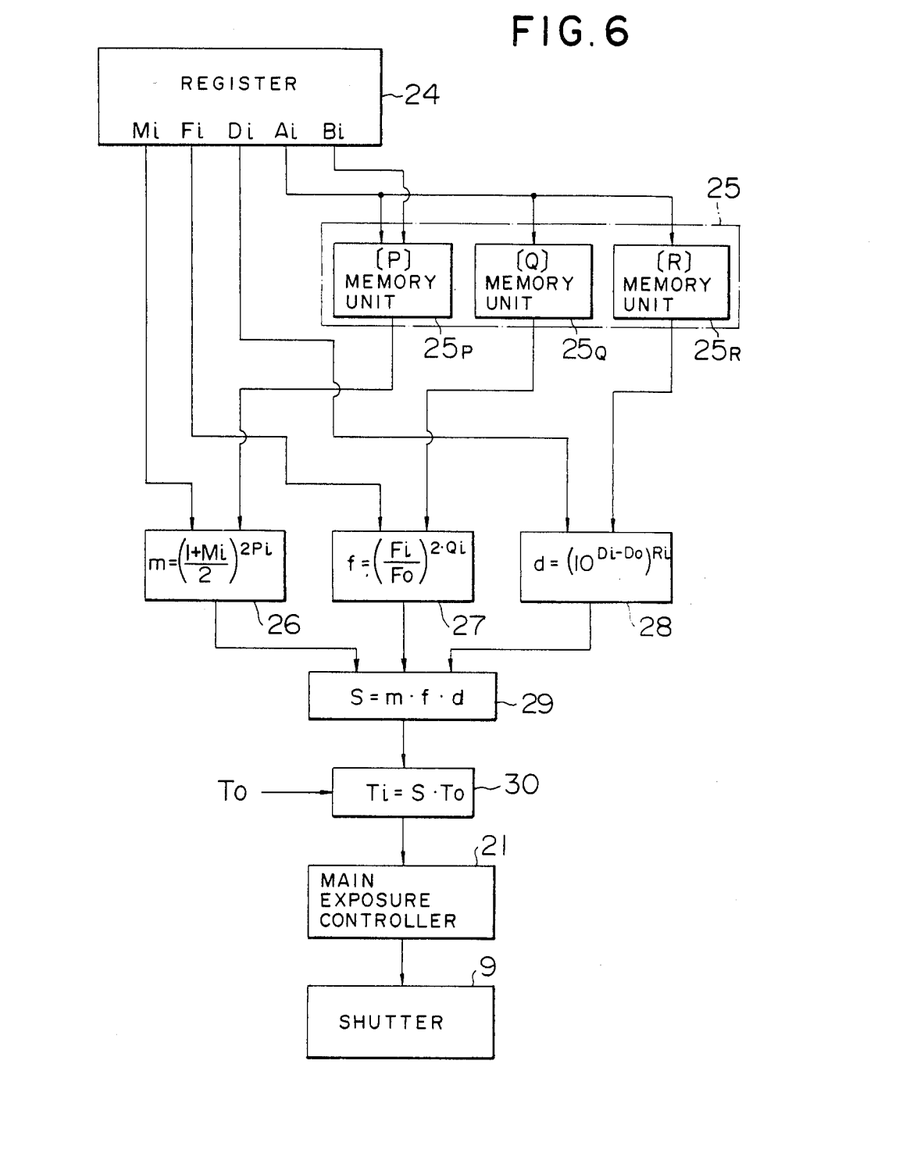
FIG. 6 is a block diagram of the first embodiment of an exposure time determination system which calculates the proper exposure time in consideration of the reciprocity law failure of a photosensitive material according to the present invention.

FIG. 6 shows a first embodiment of an exposure time determination system which calculates a proper exposure time Ti according to the formula (8) by means of the CPU 15.

The correction factors Pi, Qi and Ri are stored in memory units 25P, 25Q and 25R of the memory 25 having independent addresses. The correction factor Pi relative to the reproduction scale Mi is read out of the memory unit 25P by addressing by means of the serial numbers Ai and Bi. The correction factors Qi and Ri in relation with the diaphragm opening size Fi and the highlight density value Di are read out of the memory units 25Q and 25R respectively by addressing by means of the serial number Ai.

The correction factors Pi, Qi and Ri read out of the memory units 25P, 25Q and 25R are sent to calculation means 26, 27 and 28 which calculate the reproduction scale term $$\left( \frac{1+Mi}{2} \right)^{2P},$$

the diaphragm opening size term $(Fi/F_0)^{2Q}$, and the highlight density value term $10^{(Di-D_0)R}$ of the formula (8), respectively, to obtain output value m, f and d. Thus the obtained output values m, f and d are multiplied by one another in a calculation means 29 to obtain a total factor S by which the reference proper exposure time $T_0$ is changed to the proper exposure time Ti for photographing, as below. That is, the total factor S is multiplied to the reference exposure time $T_0$ in a calculation means 30 to obtain the proper exposure time Ti for correcting the reciprocity law failure. Then, the main exposure controller 21 is controlled by the proper exposure time Ti obtained so that the shutter 9 may properly be opened or closed.

In the embodiment shown in FIG. 6, since the proper exposure time Ti is calculated in consideration of reciprocity law failure, it is impossible to obtain the proper exposure time Ti by correcting the theoretical exposure time Ta which is obtained according to the equation (1)

as if the reciprocity law is valid, by multiplying the variance caused by the reciprocity law failure thereto.

Figure 7:
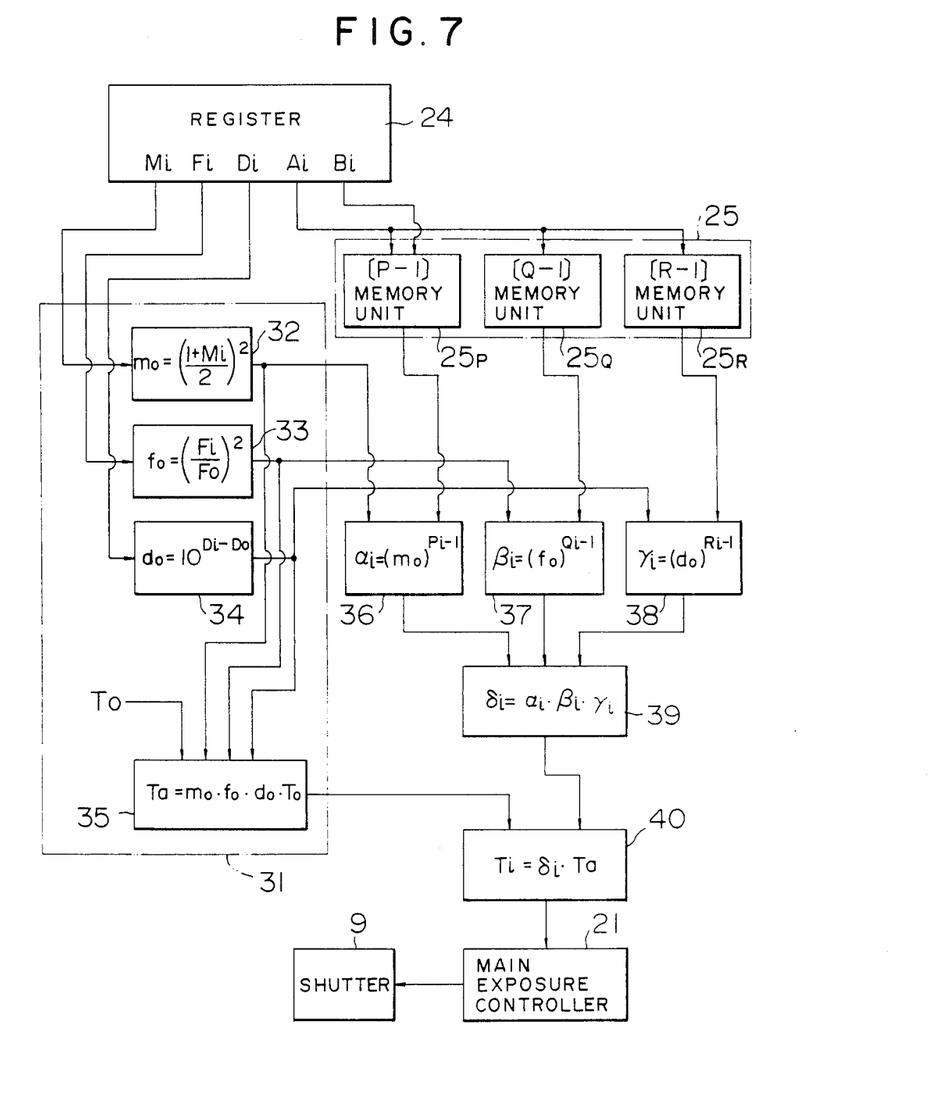
FIG. 7 is a block diagram of the second embodiment of the exposure time determination system according to the present invention.

FIG. 7 shows the second embodiment of the exposure time determination system. In this embodiment, the theoretical exposure time Ta is calculated according to the formula (1) as if the reciprocity law is valid, and then correction coefficients caused by the reciprocity law failure are obtained and are multiplied by the theoretical exposure time Ta, thereby obtaining the proper exposure time Ti, as hereinafter described in detail.

Prior to the explanation of the FIG. 7, the correction coefficients of the reproduction scale term, the diaphragm opening size term, and the highlight density value term, which are caused by the reciprocity law failure, are obtained by using the formulae (1) and (8).

When the values of the three terms are replaced by $m_0$, $f_0$ and $d_0$, as follows, $$\left(\frac{1+M_i}{2}\right)^2 = m_0$$

$$\left(\frac{F_i}{F_0}\right)^2 = f_0$$

$$10^{D_i - D_0} = d_0$$

the proper exposure time Ti is obtained by multiplying the values $m_0$, $f_0$ and $d_0$ of the three terms by the correction coefficients $\alpha$, $\beta$ and $\gamma$ of the three terms, caused by reciprocity law failure, in the following formula (9).

$$Ti = \alpha m_0 \cdot \beta f_0 \cdot \gamma d_0 \cdot T_0 \qquad (9)$$

On comparing the formula (8) with the formula (9), the correction coefficients $\alpha$, $\beta$ and $\gamma$ are obtained as follows.

$$m_0^P = \alpha \, m_0 \qquad \alpha = m_0^{P-1} \qquad (10)$$

$$f_0^Q = \beta \, f_0 \qquad \beta = f_0^{Q-1} \qquad (11)$$

$$d_0^R = \gamma \, d_0 \qquad \gamma d_0^{R-1} \qquad (12)$$

In this embodiment, instead of the correction factors P, Q and R of the first embodiment, index numbers (P−1), (Q−1) and (R−1) for obtaining the correction coefficients $\alpha$, $\beta$ and $\gamma$ by using the formulae (10), (11) and (12) are stored in the memory units 25P, 25Q and 25R.

In a block 31 shown in FIG. 7 by a two-dotted line enclosing calculation means 32 35, the calculation means 32, 33, and 34 calculate the values $m_0$, $f_0$ and $d_0$ respectively, and the calculation means 35 multiplies the reference exposure time $T_0$ by the obtained values $m_0$, $f_0$ and $d_0$ sent from the calculation means 32 - 34, thereby obtaining the theoretical exposure time Ta which is to be sent to calculation means 40.

Meanwhile, the values $m_0$, $f_0$ and $d_0$ are fed from the calculation means 32, 33 and 34 to calculation means 36, 37 and 38, respectively, and the index numbers (Pi−1), (Qi−1) and (Ri−1) are also sent from the memory units 25P, 25Q and 25R to the calculation means 36, 37 and 38, respectively. In the calculation means 36, 37 and 38 correction coefficients $\alpha i$, $\beta i$ and $\gamma i$ are calculated according to the formulae (10), (111) and (12).

Thus the obtained correction coefficient $\alpha i$, $\beta i$ and $\gamma i$ are multiplied by one another in calculation means 39 to obtain a total correction coefficient $\delta i$ which is sent to the calculation means 40. Then, the theoretical exposure time Ta and the total correction coefficient $\delta i$ are multiplied by each other to obtain the proper exposure time Ti for which reciprocity law failure is corrected. Then, the main exposure controller 21 is controlled by the proper exposure time Ti so that the shutter 9 may properly be opened or closed.

Figure 8:
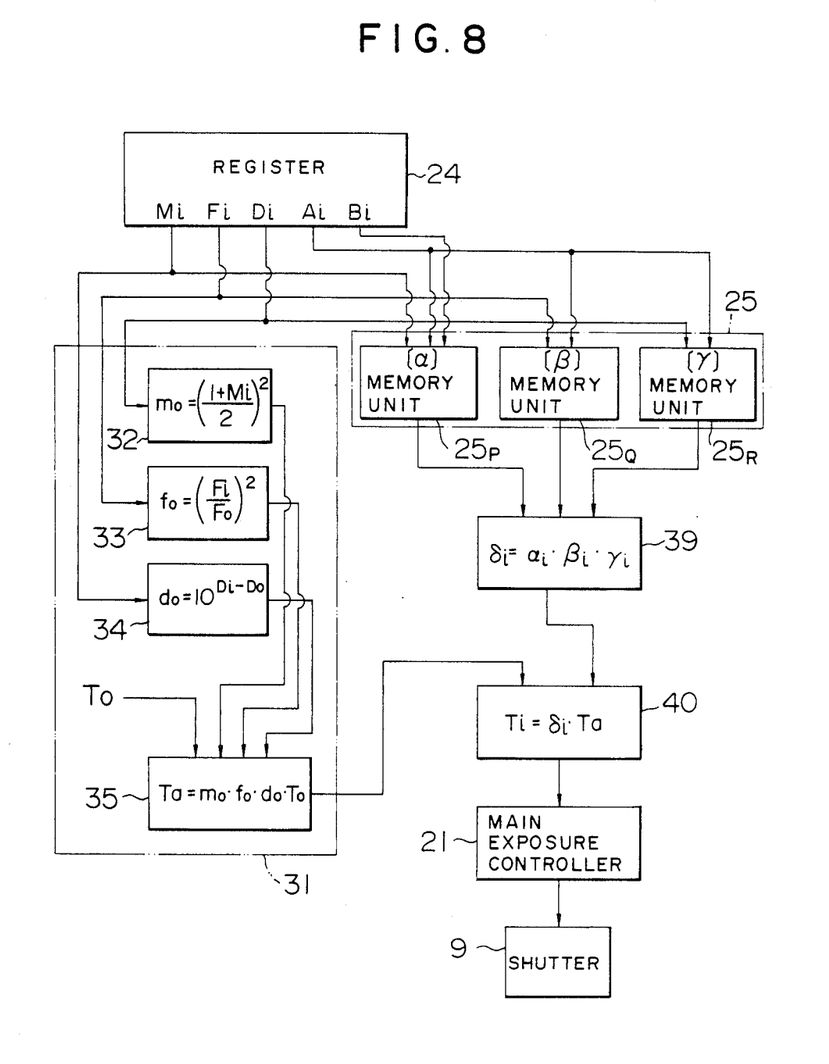
FIG. 8 is a block diagram of the third embodiment of the exposure time determination system according to the present invention.

FIG. 8 shows the third embodiment of the exposure time determination system having almost the same construction as the one of FIG. 7, except that the calculation means 36 - 38 are omitted, and that the correction coefficients $\alpha i$, $\beta i$ and $\gamma i$ obtained according to the formulae (10), (11) and (12) are stored in the memory units 25P, 25Q and 25R.

In this embodiment, the correction coefficient $\alpha i$ is read out of the memory unit 25P by addressing by means of the reproduction scale $M_i$ and the serial numbers $A_i$ and $B_i$. The correction coefficient $\beta i$ is read out of the memory unit 25Q by addressing by means of the diaphragm opening size $F_i$ and the serial number $A_i$, and the correction coefficient $\gamma i$ is read out of the memory unit 25R by addressing by means of the highlight density value $D_i$ and the serial number $A_i$.

The correction coefficients $\alpha i$, $\beta i$ and $\gamma i$ read out are sent to the calculation means 39 and the total correction coefficient $\delta i$ is calculated therein in the same manner as the second embodiment shown in FIG. 7. The other steps are the same as those of the second embodiment and thus their description is omitted.

In this case, even when the theoretical exposure time Ta is obtained by another means different from one included in the block 31, the correction of reciprocity law failure can be carried out.

Further, in a picture reproducing apparatus in which the photosensitive material and the focusing lens are not interchangeable, the correction coefficients $\alpha$, $\beta$ and $\gamma$ correspond to the reproduction scale $M_i$, the diaphragm opening size $F_i$ and the highlight density value $D_i$. Hence, the memory units 25P, 25Q and 25R of a fixed type memory having a small capacity can be employed.

In the embodiments shown in FIGS. 6-8, the calculation means may be digital or analog calculation circuits. When the calculation means are the analog calculation circuits, the data output from the memory 25 must be converted from the digital data into the analog data in digital-analog converters.

In the analog calculation, the correction factors P, Q and R, the index numbers (P−1), (Q−1) and (R−1), and the correction coefficients $\alpha$, $\beta$ and $\gamma$ may be set by using analog data setters. For example, analog voltages are set by potentiometers in order to set the factor P, Q and R corresponding to the serial numbers of the photosensitive materials on the basis of a table including the correction factors P, Q and R of the photosensitive materials, without using the memory units.

Figure 9:
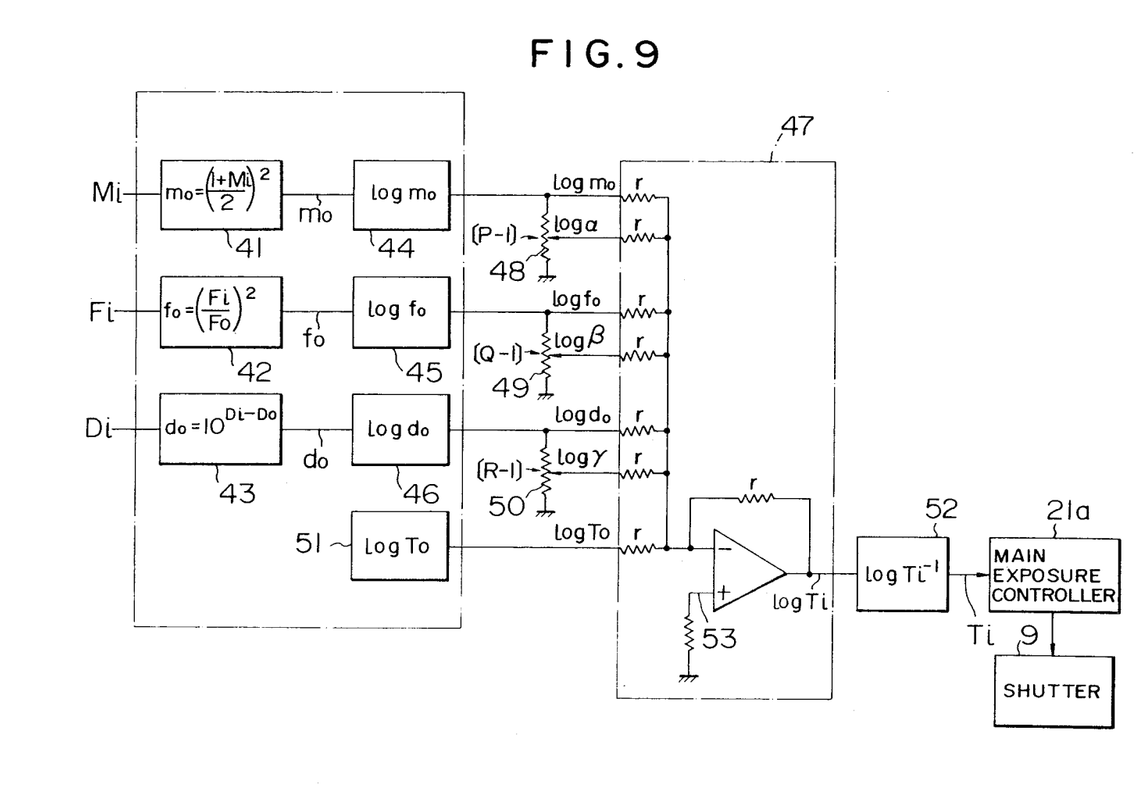
FIG. 9 shows one embodiment of an analog exposure time determination system according to the present invention.

FIG. 9 shows one embodiment of an analog exposure time determination system which performs a method like the one performed by the system of FIG. 7.

In this embodiment, the reproduction scale $M_i$, the diaphragm opening size $F_i$ and the highlight density value $D_i$ set in the analog values are input to a reproduction scale term calculation circuit 41, a diaphragm opening size term calculation circuit 42 and a highlight density value term calculation circuit 43, which outputs the values $m_0$, $f_0$ and $d_0$, respectively. Then, the calculation values $m_0$, $f_0$ and $d_0$ are fed to logarithmic converters 44, 45 and 46, respectively, wherein the values $m_0$, $f_0$ and $d_0$ are logarithmically converted.

Then, the logarithmically converted values $\log m_0$, $\log f_0$ and $\log d_0$ are sent to respective potentiometers 48, 49 and 50 in which the divisional ratios corresponding to the index numbers $(P-1)$, $(Q-1)$ and $(R-1)$ are set respectively, an adder 47 comprising an operational amplifier and resistors shown by a single-dotted line, and are converted therein into logarithmic values $\log \alpha$, $\log \beta$ and $\log \gamma$ of the correction coefficients $\alpha$, $\beta$ and $\gamma$, such as according to the following equations.

$$\log \alpha = (P-1) \log m_0$$

$$\log \beta = (Q-1) \log f_0$$

$$\log \gamma = (R-1) \log d_0$$

A logarithmic value $\log T_0$ of the reference exposure time $T_0$ is fed from a logarithmic value setter 51 to the adder 47. The logarithmic values $\log \alpha, \log \beta, \log \gamma$ and $\log T_0$ are added in the operational amplifier of the adder 47 to output a logarithmic value $\log T_i$ of the proper exposure time, of which the reciprocity law failure is corrected. Then, the logarithmic value $\log T_i$ is converted into the proper exposure time $T_i$ in an antilogarithmic converter 52. Then, the signal corresponding to the proper exposure time $T_i$ is sent to a main exposure controller 21', and it controls the main exposure controller 21' so that the shutter 9 may properly be opened or closed.

When the index number $(P-1)$, $(Q-1)$ or $(R-1)$ has a negative value, its absolute value is set to the potentiometer 48, 49 or 50 as the divisional ratio, and the output signal of the potentiometer 48, 49 or 50 is fed to a subtraction terminal 53 of the operational amplifier of the adder 47.

According to the present invention, the proper exposure time $T_m$ with respect to the magnification variation can be obtained according to the following empirical formula (13), instead of the formula (3), wherein P' means a correction factor for correcting the reciprocity law failure due to the magnification.

$$Tm = \frac{[2 + (m - 1)P']^2}{4} \cdot T_0 \qquad (13)$$

The proper exposure time $T_f$ or $T_d$ with respect to the diaphragm opening size $F_i$ or the highlight density value $D_i$ may also be obtained in the similar manner to the above method relative to the formula (13).

It is found that when magnification of the standard photography condition is equal to the original size (i.e., $m=1$), for example, correction coefficients (p in formula (8) and p' in formula (13)), of reciprocity law failure varying its value in response to variation of magnification at an enlarging magnification at which quantity of light on a focus plane (image formation plane) is smaller than the size of the original differs from that of a reducing magnification at which quantity of light on the focus plane is larger than the size of the original.

In other words, the correction coefficient p and p' are different for increases and decreases in magnification, as compared with the situation when the magnification m is equal to 1. In addition, under conditions of reciprocity law failure, the coefficient found for magnification m greater than 1 is larger than the coefficient found for magnification m less than 1, under the same conditions.

By the way correction coefficients p' (formula (13)) of reciprocity law failure in those cases in which at every combination of a photosensitive film to be used and developing condition therefor is as follows:

| Developing condition | Pair of Photosensitive Film | | | | | |
|---|---|---|---|---|---|---|
| | 1 | 2 | 3 | 4 | 5 ... | 10 |
| m>1 1 value of p' | 1.05 | 1.10 | 1.15 | 1.20 | 1.25 ... | 1.45 |
| m>1 1 value of p' | 1.00 | 1.00 | 1.00 | 1.00 | 1.05 ... | 1.28 |

In other words, when a given film was found to have a coefficient p' of 1.05 for magnification m greater than 1, such film had a coefficient p' of 1.00, for reproduction when the magnification m was less than 1. Similarly, for example, when it was found that a film had a coefficient p' of 1.45, for magnification greater than 1, this film had a coefficient p' of 1.28, for correct reproduction with magnification m less than 1. The coefficient p' is hence also dependent upon the direction of change of the condition, with respect to conditions at which the reciprocity law is valid.

As described above, by obtaining correction coefficient previously, and according to the photosensitive film and developing condition, for example, if each of said correction coefficients is stored in a memory at respective channels, an appropriate exposing time can be obtained by selecting each of the corresponding channels.

What is claimed is:

1. A method for controlling the exposure time in the reciprocity law failure range of a photosensitive material, in a picture reproducing machine, wherein the response time variation cause by variations is corrected according to the operational equation for the reciprocity law when the photosensitive material is in its linear range, said method comprising exposing said photosensitive material for a time $T_m$ in accordance with the relationship;

$$Tm \left( \frac{1 + Mi}{2} \right)^{2P} \cdot T_0$$

wherein $T_0$ is the correct exposure time in the absence of reciprocity law failure, $M_i$ is the desired reproduction scale and P is an empirically determined coefficient which is greater for enlargements than reductions.

2. A method for controlling the exposure time in the reciprocity law failure range of a photosensitive material in a picture reproducing machine, wherein the response time variation caused by variations is corrected according to the operational equation for the reciprocity law when the photosensitive material is in its linear range, said method comprising exposing said photosensitive material for a time $T_m$ in accordance with the relationship;

$$Tm = \frac{[2 + (m - 1)P]^2}{4} \cdot T_0$$

wherein $T_0$ is the correct exposure time in the absence of reciprocity law failure, m is the magnification of the reproduction, and P is an empirically determined correction coefficient that is greater for magnification greater than 1 then for magnification less than 1.

3. A method for controlling the exposure time in the reciprocity law failure range of a photosensitive material, in a picture reproducing machine, wherein the response time variation cause by variations is corrected according to the operational equations for the reciprocity law when the photosensitive material is in its linear range, said method comprising empirically determining a plurality of values P for a given photographic emulsion that satisfy the relationship;

$$Tm \left( \frac{1 + Mi}{2} \right)^{2P} \cdot T_0$$

wherein $T_0$ is the correct exposure time in the absence of reciprocity law failure, $T_m$ is the correct exposure time corresponding to each of said value of P, and $M_i$ is the magnification, and then exposing a film of said emulsion at a time $T_m$ corresponding to the determined value of the coefficient P corresponding to the respective magnification $M_i$.

4. A method for controlling the exposure time in the reciprocity law failure range of a photosensitive material, in a picture reproducing machine, wherein the response time variation caused by variations is corrected according to the operational equation for the reciprocity law when the photosensitive material is in its linear range, said method comprising empirically determining a plurality of correction coefficient values P' for a given photographic emulsion that satisfy the relationship;

$$Tm = \frac{[2 + (m - 1) P']^2}{4} \cdot T_0$$

wherein $T_0$ is the correct exposure time in the absence of reciprocity law failure, $T_m$ is the empirically determined correct exposure time under conditions of reciprocity law failure, and m is the magnification, and exposing a film of said emulsion at the time $T_m$ of the corresponding coefficient P' for the respective magnification m.

* * * * *

UNITED STATES PATENT AND TRADEMARK OFFICE
CERTIFICATE OF CORRECTION

PATENT NO. : 4,525,065
DATED : June 25, 1985
INVENTOR(S) : TAKAGI et al.

It is certified that error appears in the above-identified patent and that said Letters Patent is hereby corrected as shown below:

```
Column 1, line 7, after "part" insert --of--.
Column 1, line 53, change "affect" to --effect.

Column 1, line 57, change "affect" to --effect--.

Column 5, line 4, change "factos" to --factors--.

Column 5, line 45, change "affect" to --effect--.

Column 7, line 42, change "γd₀R-1" to --γ=d₀R-1--.

Column 7, line 65, change "(111)" to --(11)--.

Column 10, line 11, change "m>11" to --m<1--.

Column 10, line 68, change "then" to --than--.
```

Signed and Sealed this

Eighth Day of July 1986

[SEAL]

Attest:

DONALD J. QUIGG

Attesting Officer     Commissioner of Patents and Trademarks